United States Patent [19]

Kawata et al.

[11] 4,011,546
[45] Mar. 8, 1977

[54] DISPLAY APPARATUS

[75] Inventors: Yoshihiro Kawata; Kansei Iwata, both of Tokyo, Japan

[73] Assignee: Iwatsu Electric Co., Ltd., Tokyo, Japan

[22] Filed: July 22, 1975

[21] Appl. No.: 598,018

[30] Foreign Application Priority Data

July 27, 1974 Japan .............................. 49-86282
July 27, 1974 Japan .............................. 49-86284
July 27, 1974 Japan .............................. 49-86285

[52] U.S. Cl. ............................................ 340/172.5
[51] Int. Cl.² ........................................... G06F 3/14
[58] Field of Search ................... 340/172.5, 324 A

[56] References Cited

UNITED STATES PATENTS

| | | | |
|---|---|---|---|
| 3,189,889 | 6/1965 | Bridgett ......................... | 340/324 A |
| 3,543,240 | 11/1970 | Miller et al. ..................... | 340/172.5 |
| 3,579,225 | 5/1971 | Clark ............................. | 340/324 A |
| 3,594,608 | 7/1971 | Mutton ......................... | 340/324 A X |
| 3,668,312 | 6/1972 | Yamamoto et al. ........ | 340/324 A X |

*Primary Examiner*—Raulfe B. Zache
*Attorney, Agent, or Firm*—Oblon, Fisher, Spivak, McClelland & Maier

[57] ABSTRACT

In display apparatus wherein a picture image corresponding to an information train given by an electronic computer is written in a storage tube by a random scanning system and then the picture image is repeatedly read out of the storage tube by a raster scanning system for displaying it on the screen of a cathode ray tube, means is provided to assure precise correspondence between the information train given by the computer and the position on the screen of the cathode ray tube designated by a light pen thus producing an interruption signal to the computer.

4 Claims, 17 Drawing Figures

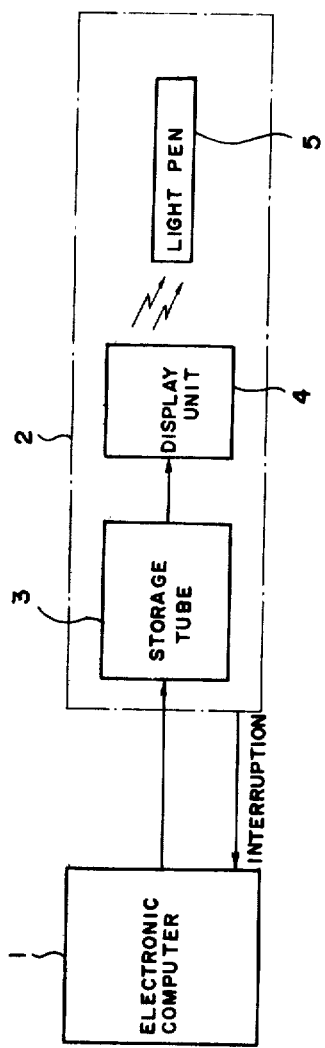
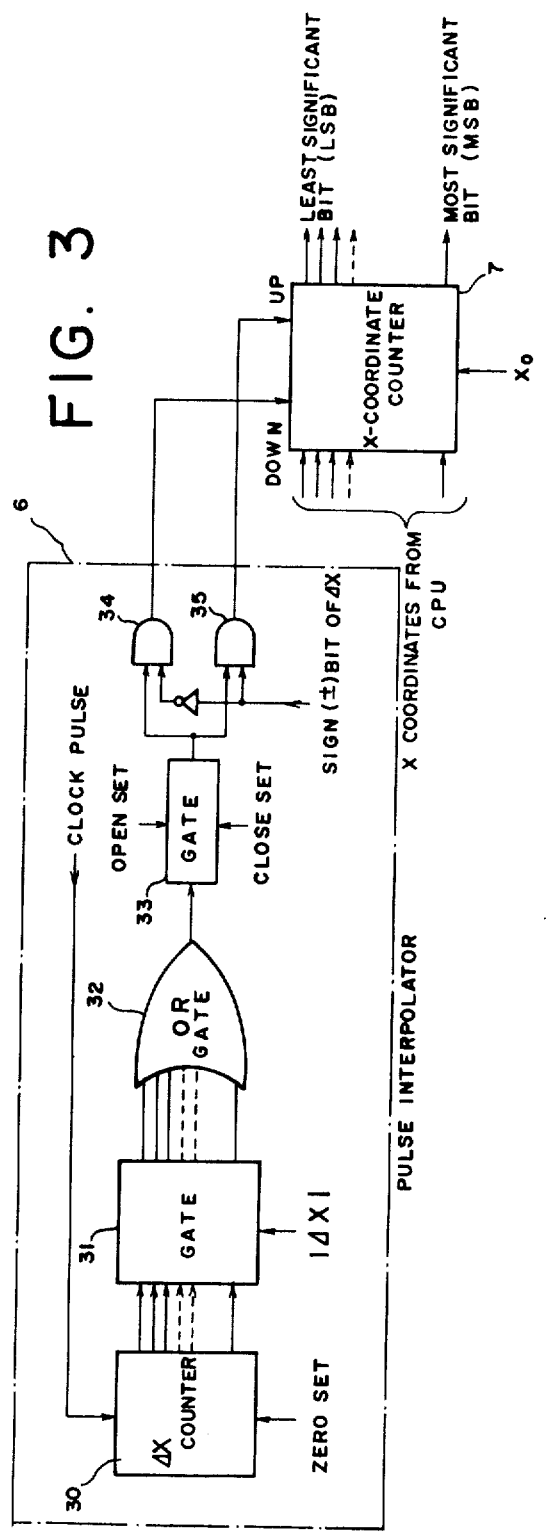

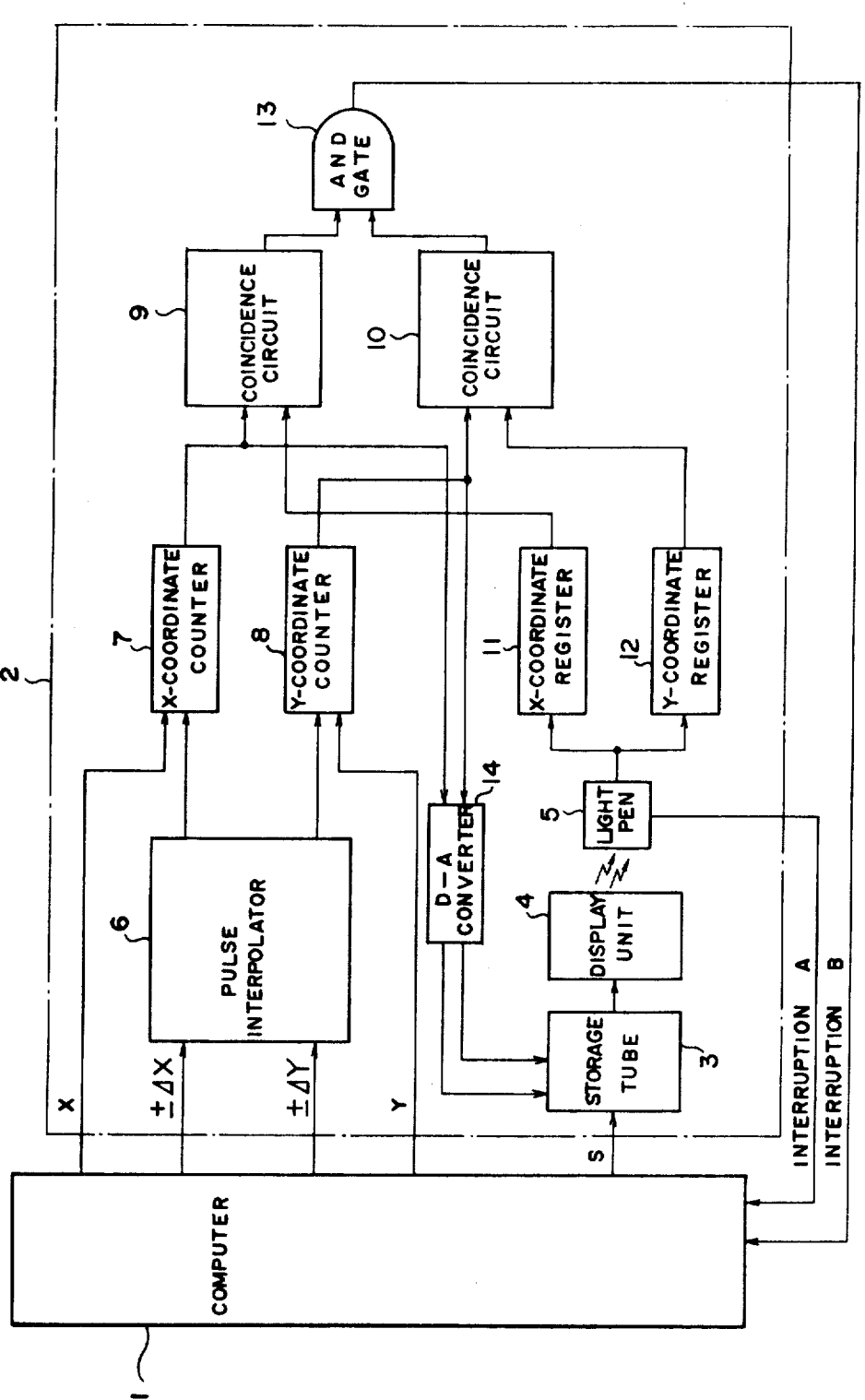

DISPLAY APPARATUS

BACKGROUND OF THE INVENTION

This invention relates to display apparatus and more particularly to display apparatus which enables to make an interruption into a computer by means of a light pen even when a storage tube is used as a memory device.

Display apparatus is utilized as means for efficiently performing the transmission of the information between an electronic computer and an operator, or the so-called man-machine communication. The output information from the computer is displayed in the form of a visible picture image and the operator gives a new command or input information to the computer based on the judgement or pattern recognition ability of the operator regarding the displayed picture image. In this manner, the operator and the computer freely exchange informations at high speeds. In most cases, cathode ray tubes are used to display the picture images wherein an information train given by the computer or a signal generated by a pattern generator designated by the information train is converted into a brightness signal and a deflection voltage of the cathode ray tube thereby displaying a picture image corresponding to the information. However, the cathode ray tube has no memory capability so that it is necessary to repeatedly apply the display information to the tube. To give such repeated information by the computer, it is necessary to operate the computer for a long time. In addition, as it is necessary to install a large capacity memory device for storing the display information thus overloading the computer of a limited processing capacity. To obviate this difficulty an improved system has been proposed in which a suitable memory device is contained in the display device itself for temporary storing the display information from the computer in the memory device which is repeatedly read out for display on a cathode ray tube. Although there are many types of memory devices that can be utilized for this purpose, storage tubes (for example scan converter tubes) are generally used because of their low cost, and the capability of switching the method of scanning and scanning speed. As the means for applying input informations to the computer from the display device are used the keyboard and function key of a typewriter and a light pen. The light pen functions to detect the light when an electron beam travelling on the display surface passes beneath the light pen for designating the position of a character or pattern of the picture or for applying a new information to the computer.

Let us consider a case wherein an information from the computer is written in a storage tube so as to be stored therein temporarily. The writing into the storage tube is not performed by a raster scanning system as in a television system but a character or pattern is written in the form of vectors by utilizing a random scanning system. This is because with the raster scanning system the quantity of the information to be written and the time required for it increase thereby increasing the operating time of the computer. Reading out of the written information by a cathode ray tube is different from the writing and, it is usual to use the raster scanning system by which the entire surface is successively scanned and read out for displaying on the cathode ray tube.

Where the information train sent from the computer to the storage tube is displayed on the screen of a cathode ray tube by a raster scanning system and where the position to be processed is designated to the computer by a light pen it is very difficult to obtain a correspondence between an output of the light pen (display position on the cathode ray tube) and the information train written in the storage tube by the computer in accordance with the random scanning system. This difficulty prevents the use of the light pen in the display apparatus utilizing a storage tube.

SUMMARY OF THE INVENTION

Accordingly it is an object of this invention to provide an improved display apparatus in which the picture image information stored in a storage tube is made to correspond to the picture image which is displayed on a cathode ray tube under a different scanning system from that for the storage tube, thereby enabling an interruption into a computer.

According to one aspect of this invention, this object can be accomplished by providing a display apparatus of the type wherein a picture image corresponding to an information train given by an electronic computer is written in a storage tube and then the picture image is repeatedly read out from the storage tube and displayed on a cathode ray tube as a picture image, said display apparatus comprising coordinate registers adapted to store the content of the coordinate values on the cathode ray tube when a light pen receives light, coordinate counters for changing their content to respond to the picture image written in the storage tube in response to a first interruption operation to the electronic computer at the time when the light pen receives light, and coincidence circuits for providing a second interruption operation to the electronic computer when the contents of the coordinate registers and the coordinate counters coincide each other thereby producing an interruption signal wherein the information signal from the electronic computer is rendered to correspond to the position designated by the light pen.

According to another aspect of this invention, there is provided display apparatus of the type wherein a picture signal corresponding to an information train given by an electronic computer is written in a storage tube and the picture image is repeatedly read out from the storage tube and displayed on a cathode ray tube as a picture image, said display apparatus comprising a horizontal-vertical counter which is preset by a signal generated when a light pen receives light and sends an interruption signal to the electronic computer, said horizontal-vertical counter operating to trigger a positioning mark generating circuit at a predetermined count after preset, a first gate circuit which opens a gate for the signal from the positioning mark generating circuit in response to a control signal from the electronic computer, a second gate circuit which opens a gate for a read out signal from the storage tube in response to a control signal from the electronic computer, said electronic computer including means responsive to the interruption effected by the reception of light of the light pen for erasing the picture image written in the storage tube and for writing the positioning mark from the first gate circuit in the storage tube by a raster scanning system, or a random scanning system, and means for bringing the storage tube in an erasing or read out condition thus enabling random scanning of an electron beam, thereby producing from the signal of the second gate circuit an interruption signal in which the information train from the electronic computer is made to correspond to the position designated by the light pen.

Another object of this invention is to provide improved display apparatus in which a designation mark display device for a light pen which has a high accuracy and can be judged visually is combined with the display apparatus thereby enabling an interruption to an electronic computer at high accuracies.

According to still another aspect of this invention, there is provided display apparatus of the type wherein a picture signal corresponding to an information train given by an electronic computer is written in a storage tube and the picture image is repeatedly read out from the storage tube and displayed on a cathode ray tube as a picture image, said display apparatus comprising a first gate circuit to be enabled or disenabled when a display device for displaying a designation mark of the light pen detects one of the dot signals obtainable in the field of the light received by the light pen, horizontal and vertical counters counting a predetermined value in response to the detected dot signal, a mark generating circuit which generates a signal which causes the designation mark to designate said one dot, and a second gate circuit which is enabled and disenabled in the opposite sense to the first gate circuit for gating a signal generated by the mark generating circuit whereby the designation marks of the light receiving points are sent to the cathode ray tube as a video signal to display it on the cathode ray tube, and the detection of one dot signal and the display of the designation mark are effected alternately.

BRIEF DESCRIPTION OF THE DRAWINGS

Further objects and advantages of the invention will become apparent from the following detailed description taken in conjunction with the accompanying drawings in which:

FIG. 1 is a block diagram showing the principle of this invention;

FIG. 2 is a block diagram showing a first embodiment of the novel display apparatus of this invention;

FIG. 3 is a block diagram showing the X-coordinate counter and the pulse interpolator shown in FIG. 2;

DESCRIPTION OF THE PREFERRED EMBODIMENTS

Figure 4:
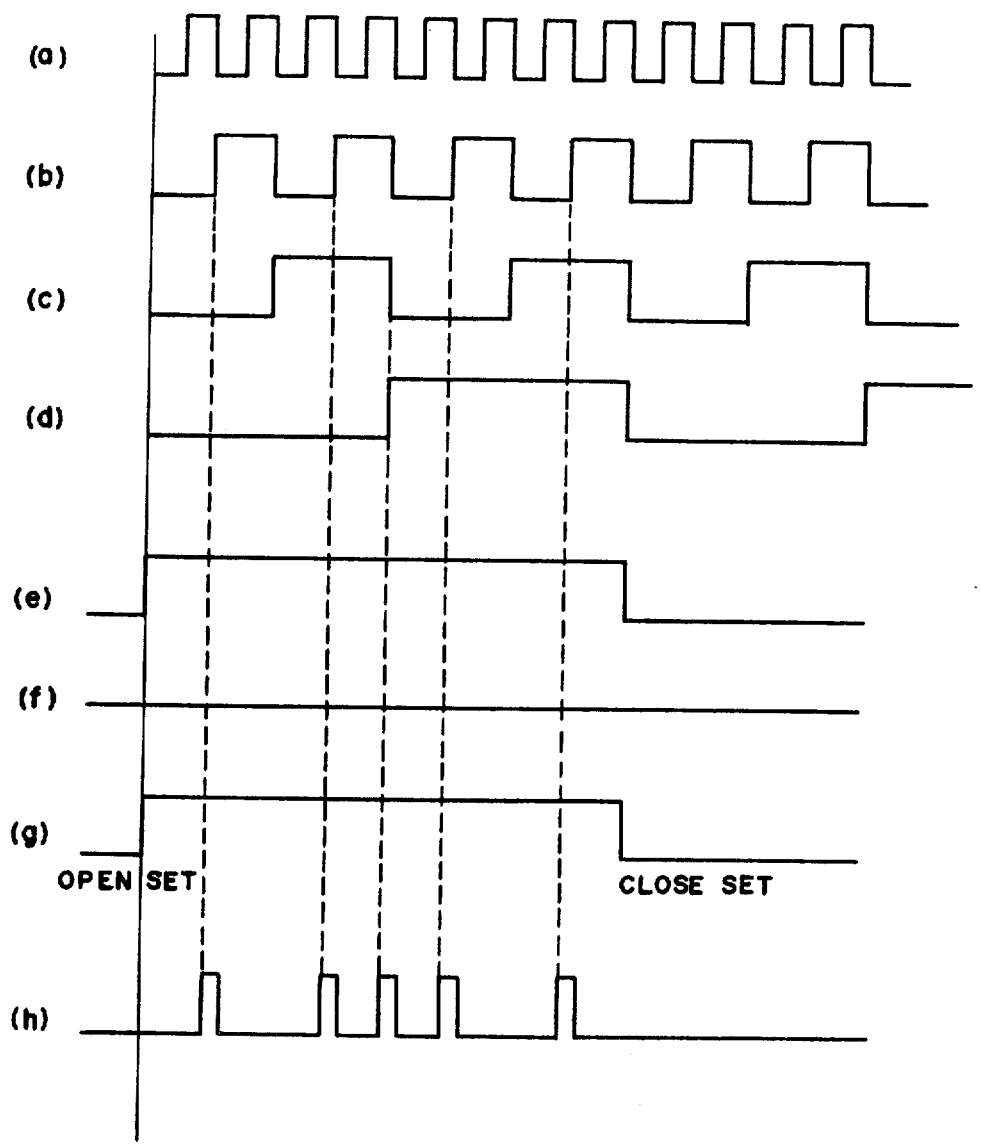
FIG. 4 shows waveforms utilized to explain the operation of the pulse interpolator shown in FIG. 3.

As diagrammatically shown in FIG. 1, according to this invention a vector information required to effect random scanning is sent from an electronic computer 1 to a storage tube 3 incorporated into a display apparatus 2 for storing the character or pattern depicted by the random scanning operation in the storage tube 3 and for displaying it on the display unit 4 when desired. The character or pattern displayed on the display unit by a raster scanning system is detected by a light pen 5 located at any position to provide a predetermined interruption for the computer 1.

A first embodiment of the display apparatus 2 of this invention shown in FIG. 2 comprises a pulse interpolator 6 which is connected to the electronic computer 1 to be supplied therefrom segments from the starting point to the end point of a pattern or character to be displayed corresponding to a vector information written in the storage tube in the form of absolute values of the relative coordinates $\Delta X$ and $\Delta Y$ along X-axis and Y-axis, and reversible X-coordinate counter 7 and Y-coordinate counter 8 which are supplied with pulses of the number corresponding to the relative coordinates $\Delta X$ and $\Delta Y$, said pulses being uniformly distributed in a definite time interval. X- and Y-coordinate counter 7 and 8 are constructed such that prior to pulse interpolation, data X and Y (initial values) are set therein. Thereafter addition or subtraction operation is made to the initial values according to the number of pulses supplied from the pulse interpolator 6 and the positive or negative sign of the pulse, and the contents of the X- and Y-coordinate counters at each instant (signals of respective digits or orders of magnitudes) are supplied to one input of individual coincidence circuits 9 and 10. Also, the contents of counters 7 and 8 are converted into analogue voltages by the action of a digital-analogue converter 14 to provide a deflection voltage for the storage tube 3. The deflection voltage is supplied to the storage tube 3 together with a brightness signal, not shown, whereby when the signal S from the computer 1 is a write command signal, a character or a pattern comprising a combination of vectors is written in the storage tube 3.

X- and Y-coordinate registers 11 and 12 are constructed to be respectively preset with the X and Y coordinates (counted by X- and Y-coordinate counters, not shown) of an electron beam raster-scanned across the screen of a cathode ray tube, not shown, in the display unit 4, the preset operation being effected by a pulse which is generated when the light pen 5 receives a bright spot of the electron beam passing thereby. This pulse is also used as an interruption signal A to the computer 1. The contents of the X, Y-coordinate registers 11 and 12 are applied to the other input of individual coincidence circuits 9 and 10 whereby the content of the X-coordinate register is compared with that of the X-coordinate counter 7 and the content of the Y-coordinate register 12 is compared with that of the Y-coordinate counter 8. AND gate circuit 13 is connected to receive the outputs of both coincidence circuits 9 and 10 so that when the outputs from both coincidence circuits are applied simultaneously, the AND gate circuit provides an interruption signal B to the computer 1. It will be clear that the coordinate system on the screen of the cathode ray tube of the display unit 4 is made to coincide with that of the storage tube 3 (the coordinate system of the coordinate counters 7 and 8).

The display apparatus shown in FIG. 2 operates as follows. Under a condition wherein the information written in the storage tube 3 is read out by raster scanning system and displayed on the cathode ray tube of the display unit 4, when the light pen 5 receives an electron beam that designates a position on a memoried pattern of the storage tube at which the interruption signal B is to be applied the coordinates on the cathode ray tube of the beam receiving point are stored in the X- and Y-coordinate registers 11 and 12. Concurrently therewith the light pen 5 applies the interruption signal A to computer 1. Upon receiving the interruption signal A computer 1 sequentially applies to the display apparatus 2 the same information train $\pm \Delta X$ and $\pm \Delta Y$ as the information which has already been written in the storage tube. Accordingly, the X-and Y-coordinate counters 7 and 8 will be supplied with the set coordinates X and Y form the computer 1 and an information train from the pulse interpolator 6 so that these counters are in a state capable of writing vectors in the storage tube 3 via digital-analogue converter 14. However, at this time, since the command signal S from the computer 1 comprises a read signal the storage tube will be maintained in the read out condition. In other words, the contents of the X and Y counters 7 and 8 vary from time to time in accordance with the information from the computer 1, but the writing into the storage tube 3 is not performed and it is maintained in the read out condition. Accordingly, the contents of the X and Y coordinate counters 7 and 8 are applied to the coincidence circuits 9 and 10, respectively. On the other hand, the values of the X and Y coordinates (preset values) on the cathode ray tube of the display unit 4 are applied to the other input of the individual coincidence circuits as comparison signals when the light pen 5 receives light so that when the comparison values of the X- and Y-coordinate coincide concurrently, the AND gate circuit 13 provides the interruption signal B to the computer 1. This interruption signal B is produced when a point on the vector information train provided by the computer 1 coincides with the vector point designated by the light pen. Thus it is possible to provide the interruption signal B so that the vector information train written in the storage tube by random scanning system may correspond to the position designated by the light pen of the picture image displayed on the cathode ray tube of the display unit 4 by the raster scanning system.

FIG. 3 shows the constructions of the X-coordinate counter 7 and the pulse interpolator 6 shown in FIG. 2. The X-coordinate counter 7 is made up of a conventional up-down counter and is constructed to be set with a data $X(X_o)$ before commencing pulse interpolation as has been described hereinabove. When an output pulse from the pulse interpolator 6 is subsequently applied to the counter this output pulse is added or subtracted according to the sign of the relative coordinate $\Delta X$. Accordingly, the output from the X-coordinate counter 7 represents the coordinates at that instant in accordance with the operation of the pulse interpolator 6. AND gate circuits 31 provided with a plurality of gates, one for each digit of the $\Delta X$ counter 30, the gate for each digit being enabled or disenabled corresponding to a binary indication of an absolute value $|\Delta X|$. A gate circuit 33 is constructed such that it will be enabled in response to an open set signal for passing pulses of the number corresponding to $|\Delta X|$ and that thereafter will be disenabled in response to a close set signal.

The pulse interpolator described above operates as follows. When the $\Delta X$ counter 30 is set to zero as shown by curves (b) to (d) shown in FIG. 4 and then operated by a clock pulse shown by curve (a) in FIG. 4, respective digits send out the pulses shown by curves (b) to (d) which are obtained by converting the clock pulse according to a master-slave system. More particularly, the output of the least significant digit of the $\Delta X$ counter 30 comprises a pulse train (FIG. 4(b)) having a period of twice times of the period of the clock pulse (FIG. 4(a)) and the output of the next to the least significant digit of the $\Delta X$ counter 30 comprises a pulse train (FIG. 4(c)) having a period of twice times of that of the pulse of the least significant digit. Where the vector information from computer 1 is $|\Delta X| = 5$, for example, the gate command signal $|\Delta X|$ applied to gate circuit 31 comprises a binary display signal 5 (101) as shown by curves (e) to (g) of FIG. 4. This gate command signal is applied to the gate circuit 31 according to the open set and close set states of the gate circuit 33. Accordingly, the pulse of the least significant digit of the counter 30 is allowed to pass through the gate circuit 33 while it is enabled. But the pulse of the next digit cannot pass through the gate circuit whereas the pulse of the third digit passes through the gate circuit. Accordingly, suitably spaced five pulses (FIG. 4(h)) formed by the leading edges of respective pulses are derived out as the outputs from the gate circuit 33. These five pulses have positive and negative signs according to the vector information from computer 1, so that the outputs from the AND gate circuits 34 and 35 act as up or down inputs to the X-coordinate counter 7.

Figure 5:
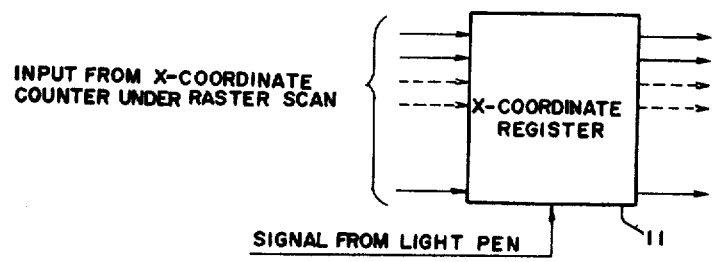
FIG. 5 is a block diagram showing a portion of the X-coordinate register shown in FIG. 2.

The X-coordinate register 11 shown in FIG. 5 is composed of a conventional register and is connected to receive the coordinates of an electron beam which undergoes a raster scanning in the display unit 4 as the inputs and is constructed to be preset by a signal which is generated by the light pen 5 when the electron beam passes through a position to which the light pen is directed.

Figure 6:
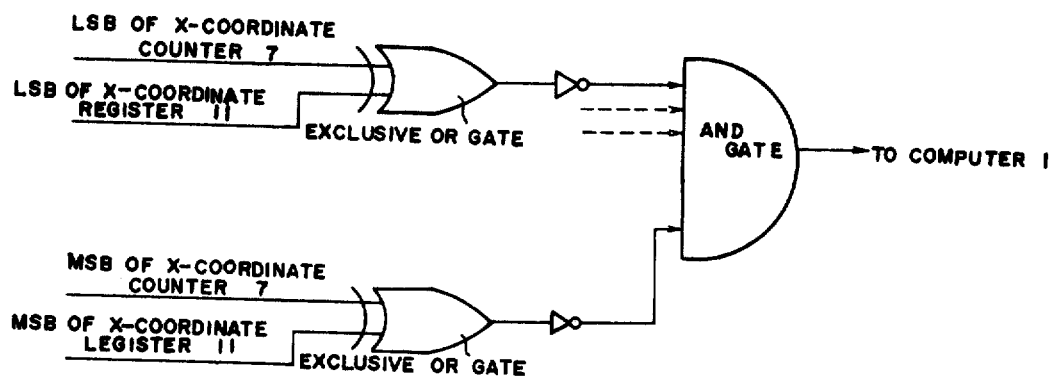
FIG. 6 is a connection diagram showing one example of the coincidence circuit shown in FIG. 2.

One example of the coincidence circuit 9 is illustrated in FIG. 6, in which digits of the same order of the X-coordinate counter 7 and X-coordinate register 11 are applied in combination to inputs of an exclusive OR gate circuit. The outputs of these exclusive OR gate circuits are inverted by inverters and then applied to an AND gate circuit. Since the operation of this coincidence circuit is well known in the art, its description is omitted. While the foregoing description refers to the X-coordinate system, it will be noted that the Y-coordinate system has the same construction. The storage tube preferably used for the present invention is detailed in the specification of U.S. Pat. No. 3,603,962 assigned to R.C.A. Corporation.

Figure 7:
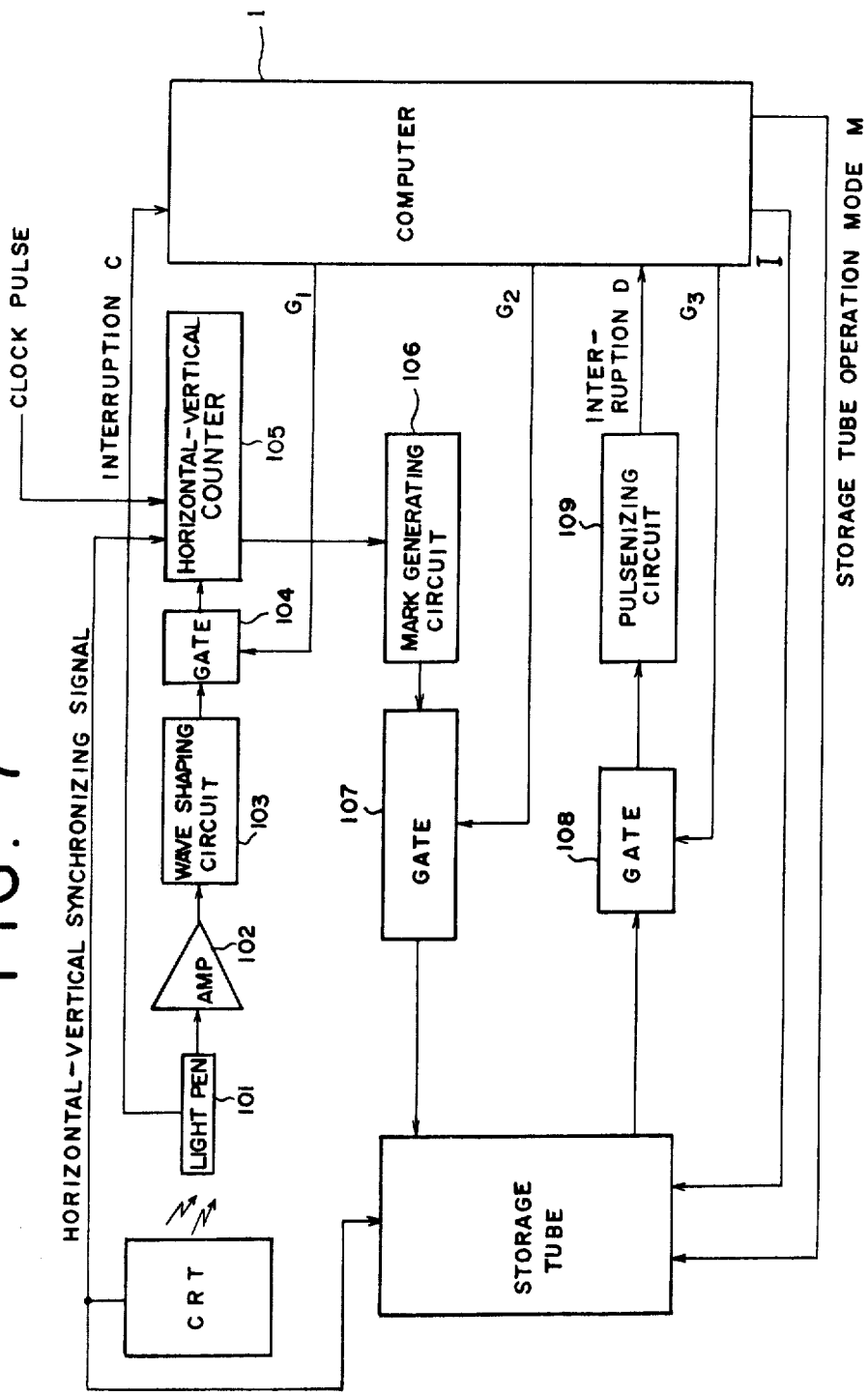
FIG. 7 is a block diagram showing a second embodiment of the display apparatus embodying the invention.

FIG. 7 is a block diagram showing a second embodiment of the novel display apparatus of this invention in which light pen 101 is used to convert the light signals of respective dots in the field of the light pen of a picture image into electric signals which are amplified by an amplifier 102 and then shaped by a wave shaping circuit 103 which is constructed to send out only the first single pulse signal. A normally opened gate circuit 104 is connected to be controlled by a control signal G1 from the computer 1. A horizontal-vertical counter 105 comprises a counter which counts cyclically at the same period as the horizontal-vertical synchronizing signal for scanning the beam across the screen of a cathode ray tube according to a raster scanning system. The counter is connected to be supplied with the clock pulse and the horizontal synchronizing signal so that the count thereof corresponds to the position of the beam. This counter is also constructed such that its content is preset when it receives a pulse signal from the wave shaping circuit 103. As described above since the horizontal-vertical counter 105 operates to cyclically count the signal, when it is applied with the single pulse signal from the wave shaping circuit 103, the information contained in that pulse will be retained in the horizontal-vertical counter 105. Actually, the preset pulse signal from the wave shaping circuit lags with respect to the instant at which the light pen receives the light, but when such time lag is compensated for, it is possible to obtain a count value of the horizontal-vertical counter 105 which is in time with the instant of light reception.

A mark generating circuit 106 is composed of a gate circuit which forms a positioning mark with the light receiving point located at the center thereof, the mark being a small square, for example. The mark generating circuit 106 is connected to the horizontal-vertical counter 105. As described above, since the count value of the horizontal-vertical counter 105 corresponding to the actual light receiving point is already known, respective count values of the horizontal-vertical counter 105 which form small squares having their centers located at the light receiving point are also known. Accordingly, a gate circuit is combined with the horizontal-vertical counter 105 such that pulses are produced only when the counter 105 reaches said count values so as to form the mark generating circuit 106. A gate circuit 107 is provided which is enabled and disenabled according to a control signal $G_2$ from the computer 1 to send out a write signal which is used to write the positioning square signals generated by the mark generating circuit 106 in the storage tube within one frame thereof by using raster scanning system. A gate circuit 108 is enabled when the storage tube which has been brought to the read out state is random scanned with an information train from the computer, thus sending an information read out from the storage tube to a pulsenizing circuit 109. This gate 108 is enabled and disenabled by a control signal $G_3$ from the computer.

Figure 8:
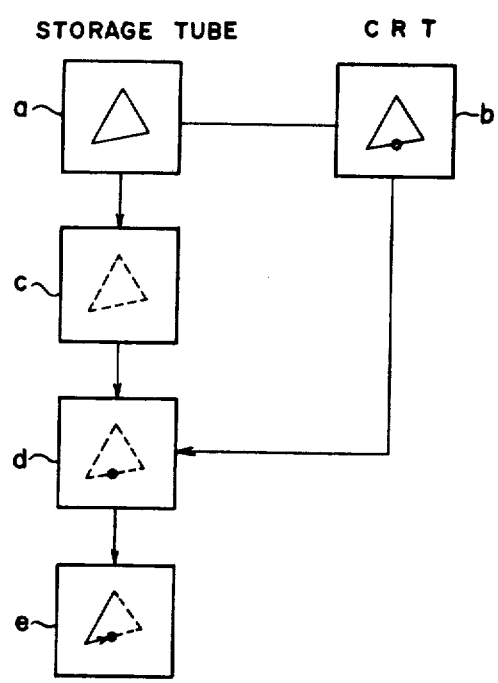
FIG. 8 is a diagram useful to explain the operation of the embodiment shown in FIG. 7.

The modified embodiment shown in FIG. 7 operates as follows. Firstly, the operation mode M of the storage tube is turned to writing-in mode. Then a picture image shown in FIG. 8a is written in the storage tube by an information train I from the computer 1 by a random scanning system. Then the picture image is displayed on a cathode ray tube (See FIG. 8b) by a raster scanning system by operating the display unit. Under these conditions, the contents of respective counters of the horizontal-vertical counter 105 vary from time to time corresponding to the electron beam which is raster scanned. Under these conditions light pen 101 is positioned at a position designated on the picture image. When the light pen receives a light spot the preset signal in the wave shaping circuit 103 presets the horizontal-vertical counter 105. As an interruption signal C is applied to the computer by a light pen switch, not shown, the computer produces a command signal G, for closing the gate circuit 104. At this time, the connection between the wave shaping circuit 103 and the horizontal-vertical counter 105 is interrupted whereby the horizontal-vertical counter 105 preserves the information contained in the preset pulse signal from the wave shaping circuit 103, When the operation mode M of the storage tube is changed to the erasion mode the computer will send out a command signal for erasing the picture image which has been written in the storage tube (FIG. 8c). Thereafter the gate circuit 107 is enabled so as to write a positioning mark sent from the mark generating circuit 106 in the storage tube by the raster scanning system (FIG. 8d). Thus, as the positioning mark is written in the storage tube by the raster scanning system in the same manner as the display operation, the position on the cathode ray tube and the position on the target of the storage tube precisely correspond with each other.

Figure 9:
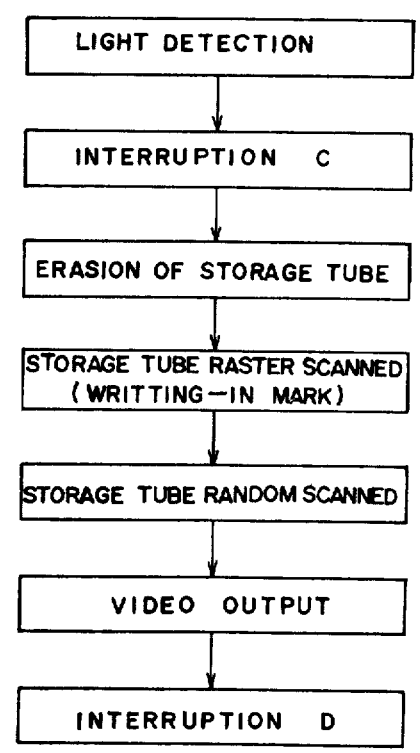
FIG. 9 is a flow chart useful to explain the operation of the embodiment shown in FIG. 7.

When the writing operation is completed the operation mode M of the storage tube is changed to the read out mode and the computer sends to the storage tube the same information train I of the erased picture image which is random scanned in the storage tube. At the same time the gate circuit 108 is enabled by control signal $G_3$. As a consequence the beam is caused to always pass the written positioning mark (FIG. 8e), and the video output produced in this manner is sent to the computer as an interruption signal D via gate circuit 108 and the pulsenizing circuit 109. In this manner, the interruption signal D from the pulsenizing circuit 109 is applied to the computer at such a point contained in the information train given by the computer as coinciding with the position designated by the light pen, thus assuring an interruption processing in which the information train from the computer precisely corresponds to the position designated by the light pen. It will be clear that such corresponding interruption processing can also be made where the picture image written in the storage tube is read out while being enlarged or reduced. The operation described above can be shown by the flow chart shown in FIG. 9.

Figure 10:
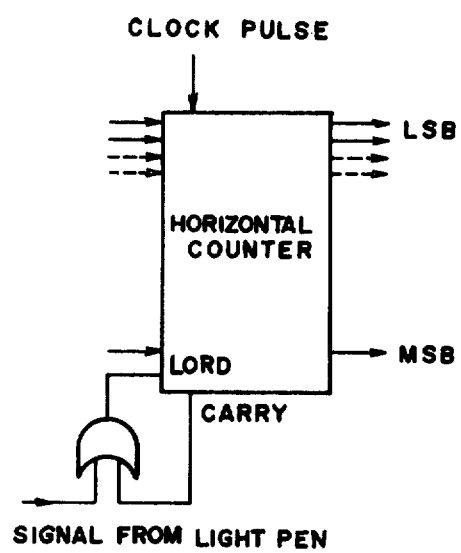
FIG. 10 is a block diagram showing the horizontal counter of the horizontal-vertical counter shown in FIG. 7.
Figure 11A:
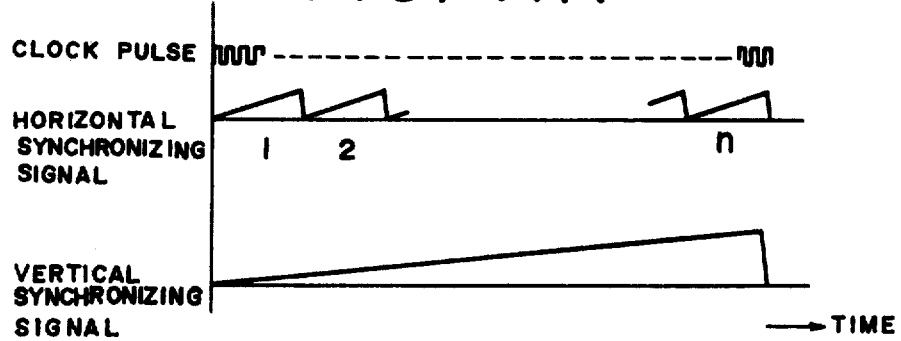
FIG. 11A is a waveform diagram useful to explain the operation of the embodiment shown in FIG. 7.
Figure 11B:
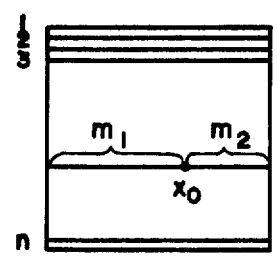
FIG. 11B is a diagram useful to explain waveforms shown in FIG. 11A.

Horizontal-vertical counter 105 comprises a combination of a horizontal counter and a vertical counter. As the horizontal and vertical counters have substantially the same construction, the construction and operation of only the horizontal counter will be described hereunder with reference to FIGS. 10 and 11. The horizontal counter shown in FIG. 10 is made up of a conventional up-counter. Where the light pen 101 produces an output signal, this signal is applied to terminal LORD of the horizontal counter via an OR gate circuit for presetting the horizontal counter at a horizontal position $x_o$ (See FIG. 11(b)) when the light pen receives light. As is well known in the art in the raster scanning system in order to scan the electron beam within one frame it is necessary to apply horizontal and vertical synchronizing signals as shown in FIG. 11(a) to the cathode ray tube. Then horizontal lines 1 through $n$ are scanned as shown by FIG. 11(b). Accordingly, where the horizontal synchronizing signal is counted by the clockpulse and where the counter is carried when one horizontal scanning line is counted, the counter that has been preset at the horizontal position $x_o$ (the position at which the light pen generates a signal) operates to fill remaining $m_2$ pulses with a resultant carry signal which is applied to terminal LORD from terminal CARRY through the OR gate circuit, and it completes the counting of $m_1$ pulses on the next horizontal scanning line to reach the positional value $x_o$. In this manner, the horizontal counter operates cyclically in synchronism with the horizontal synchronizing signal starting from a point at which the light pen generates a signal.

Figure 12:
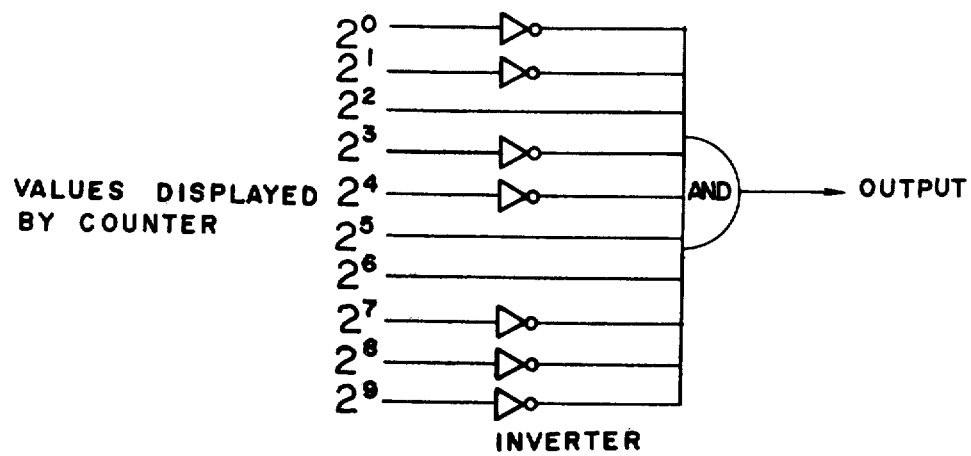
FIG. 12 is a block diagram showing one example of the mark generating circuit shown in FIG. 7 in which the mark is written by a raster scanning system.

FIG. 12 shows one example of the mark generating circuit 106 which is constructed to generate the output pulse when the count of the counter reaches 100.

Figure 13:
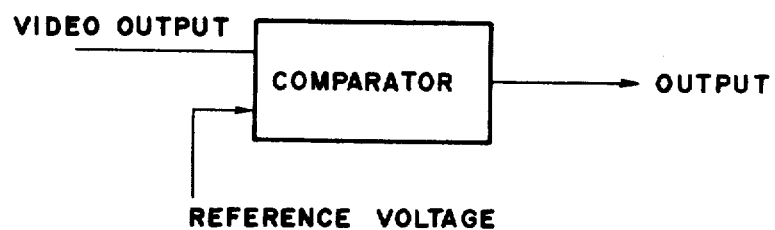
FIG. 13 is a block diagram showing one example of the pulsenizing circuit shown in FIG. 7.

FIG. 13 shows one example of a pulsenizing circuit comprising a comparator which compares the video output with a reference voltage for generating an output pulse.

As has been described hereinabove, according to the first embodiment of this invention, an interruption signal A is applied to the computer when the light pen receives light at a designated position, the contents of the coordinate values on the screen of a cathode ray tube corresponding to the position of the beam are stored in the X- and Y-coordinate registers, the contents of the X and Y coordinate counters of the storage tube are varied in accordance with the same information train given by the computer as the result of said interruption, and when the contents of the X and Y coordinate registers coincide with the contents of the X- and Y-coordinate counters an interruption signal B is applied to the computer at the position designated by the light pen. Accordingly, even when the information train given by the computer is once written in the storage tube by the random scanning system and then the information train is read out of the storage tube by the raster scanning system and displayed on the cathode ray tube, it is possible to cause the picture image designated by the light pen to precisely correspond to the information train given by the computer. Moreover, it is only necessary to add to a display apparatus such simple circuit elements as registers, coincidence circuit and simple control circuit and it is possible to use the light pen in just the same manner as in prior art apparatus.

Although in the first embodiment a circuit arrangement was shown in which the coincidence of each digit of the X- and Y-coordinate counters and that of the X and Y coordinate registers was checked it is also possible to check the coincidence of the most significant digits by neglecting the digits of lower orders of magnitude.

Thus, according to the display apparatus of this invention, even when a storage tube is as the memory device in the display apparatus, by adding simple circuits or circuit elements it is possible to assure precise correspondence between the information train given by the computer and the picture image displayed on the screen of the cathode ray tube thereby enabling interruption by the light pen.

Further according to the second embodiment of this invention, light is received at a position designated by the light pen for applying an interruption signal C to the computer, thereby erasing the picture image already written in the storage tube, a positioning mark is written by the raster scanning system in a position having the same coordinate values as the point at which the light pen receives light, thereafter the storage tube is brought to read out state, an information train having the same content as the picture image previously written in the storage tube from the computer is applied to the storage tube to be stored by random scanning system thereby producing interruption signal D to the computer from a video signal produced at a time when the electron beam passes on the positioning mark. Thus it is possible to obtain precise correspondence between the information train given by the computer and the position designated by the light pen thereby producing an interruption signal even in display apparatus utilizing a storage tube as the memory device. Further, the number of operation of the light pen may be only one and the operation method of the light pen may be the same as in the prior art display apparatus.

Since the hardwares of the computer necessary to operate the same when an interruption signal is applied thereto from the display apparatus are well known it is believed unnecessary to show and describe herein such hardwares.

In the foregoing first and second embodiments of this invention, the light pen is used to detect the brightness of an electron beam which is raster scanned. Thus, the light pen is used to apply an information to the computer from the display apparatus by detecting the light when the beam scanned across the picture image passes beneath the light pen thereby designating or pointing a specific position of the picture image or designating any position (tracking) on the picture. It is possible to detect the fact that the light pen receives the light from what portion of the screen of the cathode ray tube for the purpose of performing pointing or tracking operation, that is the position designated by the light pen.

According to a prior art method of determining the position designated by the light pen, a designation mark in the form of a light ring termed an aiming circle is emitted from one end of the light pen and the light ring is focussed on the screen of the cathode ray tube. However, as such light ring has a diameter of several mm, a position of large area is displayed thus having a low display accuracy, Moreover, as the light of the light ring provides to the operator a visible feeling quite different from the fluorescent light emanated by the screen of the cathode ray tube, it is difficult for the operator to discriminate them. This tendency is more severe when the brightness in the room is high.

According to this invention it is possible to provide an interruption to a computer at high accuracies by using display device for displaying the designation mark of a light pen which has high accuracies and easy to judge visually.

Figure 14:
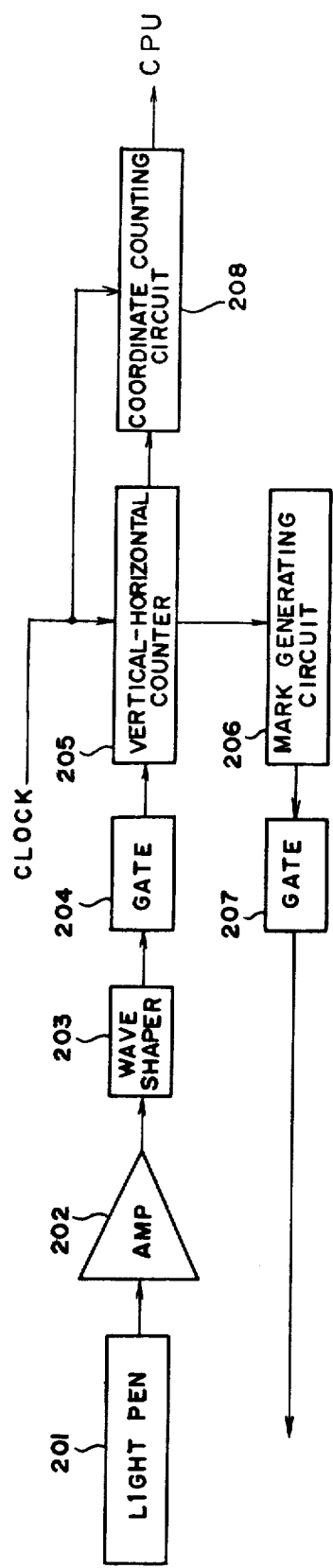
FIG. 14 is a block diagram showing one example of the display device for displaying the designation mark of the light pen.

FIG. 14 is a block diagram showing one example of the display device for displaying the designation mark of a light pen 201 which is constructed to convert the light signal of each dot of the designation mark received from the screen of a cathode ray tube, not shown, into an electric signal. After being amplified by an amplifier 202, the waveform of the electric signal is shaped by a wave shaper 203 to form a pulse signal which is applied to a gate circuit 204 constructed to pass only a single pulse signal from the wave shaper and to provide other functions to be described hereinafter. The output from the gate circuit 204 is applied to a horizontal-vertical counter 205 which is constructed to count under the control of a clock pulse which controls the entire display apparatus and a horizontal synchronizing signal. The counter 205 operates cyclically with the same period as aforementioned horizontal and vertical synchronizing signals. When applied with the pulse signal from the gate circuit 204, the contents of the horizontal-vertical counter 205 is reset to zero and then the counter starts to count the clock signal and the horizontal synchronizing signal starting from the zero count. The output from the horizontal-vertical counter 205 is supplied to a mark generating circuit 206 which is constructed to generate a pulse signal only when the count of the horizontal-vertical counter 205 reaches a predetermined value (to be described later). The output from the mark generating circuit 206 is applied to a gate circuit 207 which is constructed to pass the output from the mark generating circuit 206 to a cathode ray tube to act as a video signal and to be enabled and disenabled in the opposite sense as that of the gate circuit 204. In other words, when the gate circuit 204 is enabled, the gate circuit 207 is disenabled and vice versa. A coordinate counting circuit 208 is connected to receive the output of the horizontal-vertical counter 205 and the clock pulse and comprises an identical counter as the horizontal-vertical counter 205. The coordinate counting circuit 208 is constructed such that its count always corresponds to the position of the electron beam of the cathode ray tube and to send its content to the computer as a signal designating the position of the light pen 201 when the count of the horizontal-vertical counter 205 becomes to correspond to the light receiving point of the light pen.

Figure 16:
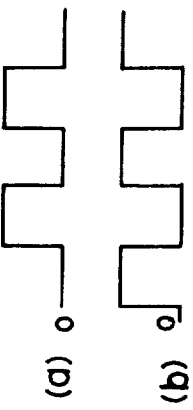
Figure 15:
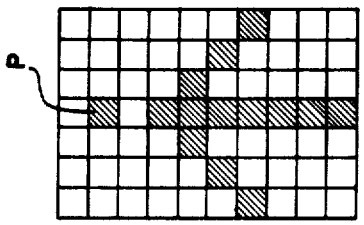
FIG. 15 is a diagram useful to explain the operation of the display device shown in FIG. 14 and FIG. 16 are waveforms useful to explain the operation of the display devices shown in FIG. 14

The operation of the display device shown in FIG. 14 will now be described with reference to FIGS. 15 and 16. When an electron beam is scanned across a picture by the raster scanning system, the gate circuit 204 is enabled and the contents of the horizontal-vertical counter 205 and the count of the coordinate counting circuit 208 vary from time to time according to the position of the beam. Under these conditions, when the beam passes a position designated by the light pen 201, the light pen will receive light from respective dots in the field thereof and the signals generated by the light pen are converted into a pulse train whose waveform has been shaped by the wave shaper 203. The gate circuit 204 passes only a specific single pulse (for example the pulse corresponding to the first dot) of the pulse train to the horizontal-vertical counter 205 to act as a reset pulse. After reset, the horizontal-vertical counter continues its counting operation, and when its count reaches a predetermined count the counter 205 applies a trigger signal to the mark generating circuit 206 thus causing it to generate a mark signal. The predetermined count has a value such that the designation mark shown by a shaded arrow in FIG. 15 is directed to the light receiving point $p$ when the reset pulse is applied to the horizontal-vertical counter 205 from the light pen 201 which is located at the light receiving point $p$. The mark generating circuit 206 operating with such a timing applies its output to the cathode ray tube through gate circuit 207. At the same time, the coordinate counting circuit 208 sends an information regarding the light receiving point $p$ to the computer. The gate circuits 204 and 207 are operated at such timing that the light signal pulse and the designation mark signal from the mark generating circuit 206 are passed alternately through the gates 204 and 207, respectively, as shown by curves $a$ and $b$ of FIG. 16. In other words, while the light pen 201 is receiving the light, the designation mark is not displayed and vice versa. For this reason, there is formed no light loop in which the light of the designation mark is received by the light pen.

The use of gate circuits 204 and 207 causes the designation mark to flicker, thus causing correct visual judgement of the displayed designation mark.

With the above described display device the gate circuit 204 detects only one dot signal among a plurality of dot signals produced by the light pen 201, the horizontal-vertical counter 205 cooperates with the mark generating circuit 206 to generate a designation mark designating a specific single dot, and the gate circuit 207 enabled and disenabled in the opposite sense as the gate circuit 204 controls the passage of the signal from the mark generating circuit 206 so that by the addition of a simple circuit it is not only possible to accurately display the position designated by the light pen in terms of the position of the dot but also to cause the displayed designation mark to flicker which is advantageous from the standpoint of visual identification of the displayed mark.

Although in this embodiment, the designation mark was shown as an arrow it should be understood that the shape of the designation mark may take other forms such as a V provided that the direction can be judged by the shape of the mark and that the direction of the displayed mark may be vertical or horizontal.

It should be understood that although the invention has been shown and described in terms of some preferred embodiments it will be clear that many changes and modifications may be made without departing from the spirit and scope of the invention as defined in the appended claims.

What is claimed is:

1. In display apparatus of the type wherein a picture image corresponding to an information train given by an electronic computer is written in a storage tube and the content of the storage tube is repeatedly read out of the storage tube to display the picture image on the screen of a cathode ray tube, the improvement which comprises coordinate registers adapted to store the content of the coordinate values of the position of a light pen on said screen of the cathode ray tube when the light pen receives light, coordinate counters connected to receive the information train, directly and through a pulse interpolator, from said electronic computer for changing their content in accordance with the picture image written in said storage tube by a first interruption to said electronic computer which is made at the time when said light pen receives light, and coincidence circuits connected to receive contents of said coordinate counters and coordinate registers for providing a second interruption through an AND gate to said electronic computer when the contents of said coordinate registers and said coordinate counters coincide with each other, thereby said second interruption signal ensuring precise correspondence between said information train from said electronic computer and the position designated by said light pen.

2. The display apparatus according to claim 1, wherein said information train is written in said storage tube by a random scanning system and said picture image is displayed on the screen of the cathode ray tube by a raster scanning system.

3. A method of producing an interruption signal capable of making precise correspondence between an information train given by an electronic computer and a position designated by a light pen in a display apparatus wherein a picture image corresponding to the information train is written in a storage tube and the content of the storage tube is repeatedly read out of the storage tube to display the picture image on the screen of a cathode ray tube, said method comprising the steps of detecting light at the position designated by said light pen for applying a first interruption signal to said electronic computer thereby to erase the picture image already written in said storage tube, writing a positioning mark by a raster scanning system in said storage tube at a position having the same coordinate values as the point at which said light pen receives light, bringing said storage tube into read-out state, applying the information train having the same content as the picture image previously written in said storage tube from said electronic computer to said storage tube to be stored by a random scanning system, and producing a second interruption signal identical with the interruption signal for making the correspondence from a video signal produced at a time when the electron bean passes on said positioning mark.

4. A combination of a display apparatus, wherein correspondence between an information train given by an electronic computer and a position designated by a light pen is obtained, with a display device connected to said light pen for displaying a designation mark, said designation mark display device comprising a first gate circuit, means for detecting a single dot signal among a plurality of dot signals obtainable in the field of said light pen for enabling and disenabling said first gate circuit, a horizontal-vertical counter responsive to said detected dot signal for counting a predetermined value, a mark generating circuit responsive to the output of said horizontal-vertical counter for generating a designation mark signal corresponding to said single dot signal, and a second gate circuit enabled and disenabled in the sense opposite to that of said first gate circuit for passing said designation mark signal from said mark generating circuit to said cathode ray tube whereby a mark signal designating a position at which said light pen receives light is applied to said cathode ray tube as a video signal so as to display said designation mark on the screen of said cathode ray tube and the detection of said single dot signal and the display of said designation mark are effected alternately.

* * * * *